(No Model.)

C. H. MITCHELL & R. M. VEITCH.
BICYCLE TIRE.

No. 476,670. Patented June 7, 1892.

WITNESSES.
Olive Duval
W. J. Veitch

INVENTORS.
Claudius H. Mitchell.
Richard M. Veitch.

UNITED STATES PATENT OFFICE.

CLAUDIUS H. MITCHELL AND RICHARD M. VEITCH, OF OAKLAND, CALIFORNIA.

BICYCLE-TIRE.

SPECIFICATION forming part of Letters Patent No. 476,670, dated June 7, 1892.

Application filed February 17, 1892. Serial No. 421,821. (No model.)

*To all whom it may concern:*

Be it known that we, CLAUDIUS H. MITCHELL, a subject of the Queen of England, and RICHARD M. VEITCH, a citizen of the United States, both residing at Oakland, county of Alameda, State of California, have invented a Combination Bicycle-Tire, of which the following is a specification.

Our invention relates to improvements in bicycle-tires; and our objects are, first, durability; second, lightness; third, strength; fourth, resilience; fifth, cheapness and ease of replacing worn-out tires; sixth, non-explosive and freedom from necessity of continual repairs by punctures or cuts; seventh, the automatic adhesion of the rubber tire to the metal felly; eighth, the application of a flat spiral spring to produce the necessary resilience; ninth, the application of metal bands on the inner circle of spring, one acting as a stay for the spring, the other serving the same purpose, with the additional advantage of being a washer for the spokes. We attain these objects by the mechanism illustrated in the accompanying drawings, in which—

Figure 1:
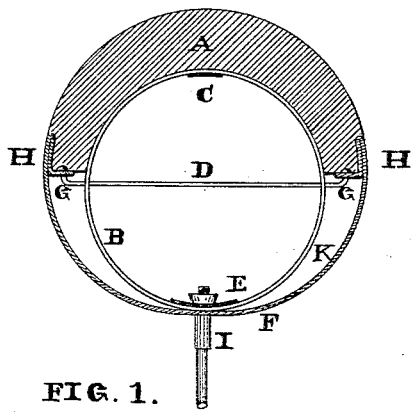
Figures 2, 3:
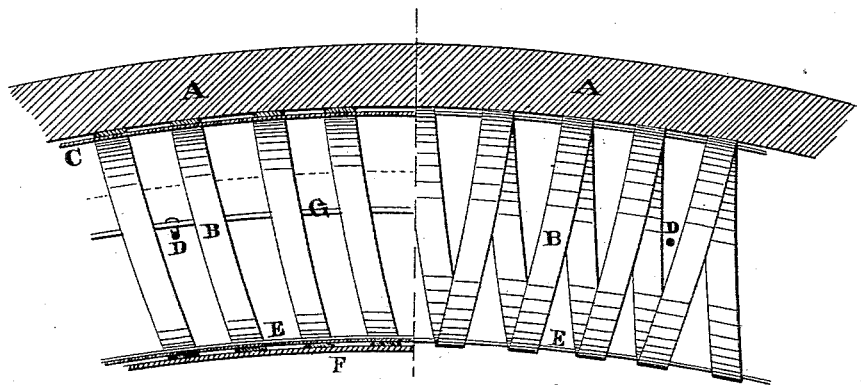
Figure 4:
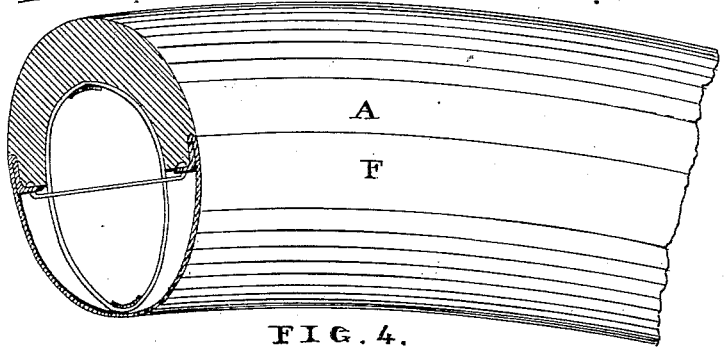

Figure 1 is a cross-section. Fig. 2 is a longitudinal section. Fig. 3 is a longitudinal section showing the outside of metal spring, the felly removed. Fig. 4 is an elevation.

Similar letters relate to similar parts throughout the several views.

A is a covering of rubber passing over the continuous flat spiral B. The object of the rubber A is to give a soft yielding substance to run on, and the object of the spring B is to keep the rubber in place and at the same time to give it the necessary resilience.

The object of the continuous band of metal C on the inside of the large diameter of the spiral spring B is to keep the coils of the spring the proper distance apart by being either braced or soldered to them.

The tie-rod D is a light metal rod to prevent the spreading of the metal felly F.

The object of the continuous metal band E on the inside of the smaller diameter of the spring B is to keep the spring B fastened to the metal felly F, also to give greater body of metal for the nipple-heads of the spokes I and to act as a washer for the nipple-heads.

The object of lugs on the metal felly at G G is to give greater cementing-surface for the rubber tire A. They also serve as a bearing to prevent the rubber tire A from being forced into the displacement-space K and also provide a fastening for the tie-rods D. They have been kept away from the spring B to allow for displacement under weight of the rubber tire A and the spring B, and also to prevent chafing of the spring B against the lugs G. The sides of the metal felly at H are brought up so as to act as a shoulder for the rubber tire A, and it will be seen that the greater the pressure that is brought to bear on the rubber tire A and the spring B the greater will be the pressure of the rubber against the sides of the metal felly at H and the more difficult it will be to tear it from its correct position.

The tire A will be cemented to the spring B, making it very difficult to tear the rubber tire A loose, which is an advantage over the present form of bicycle-tires.

The object of the space K is to allow for the displacement of the spring B.

We are aware that prior to this invention tires of this size have been made depending on air-pressure to keep them inflated, and under certain conditions these will become punctured by sharp obstacles, or on striking some hard obstruction will explode, in either case making immediate repairs necessary.

What we claim as our invention, and desire to secure by Letters Patent, is—

The combination of a tire having metal spring and metal bands C and E, and the rod D, and the mode of connection between the rubber portion of the tire A and the metal felly at H, as shown, for the purpose as specified.

CLAUDIUS H. MITCHELL.
RICHARD M. VEITCH.

Witnesses:
OLIVER DUVAL,
W. T. VEITCH.